United States Patent
Ho

(10) Patent No.: US 9,772,209 B2
(45) Date of Patent: Sep. 26, 2017

(54) EXTERNAL METERING VALVE OF GAS FUEL TANK

(71) Applicant: SUPERIOR POWER TOOL CO., LTD., Taichung (TW)

(72) Inventor: Yu-Chuan Ho, Taichung (TW)

(73) Assignee: Superior Power Tool Co., Ltd., Taichung (TW)

( * ) Notice: Subject to any disclaimer, the term of this patent is extended or adjusted under 35 U.S.C. 154(b) by 0 days.

(21) Appl. No.: 15/077,068

(22) Filed: Mar. 22, 2016

(65) Prior Publication Data

US 2016/0320220 A1 Nov. 3, 2016

(30) Foreign Application Priority Data

Apr. 28, 2015 (TW) .............................. 104206430 U

(51) Int. Cl.
| | | |
|---|---|---|
| *B65D 83/00* | (2006.01) | |
| *G01F 3/36* | (2006.01) | |
| *G01F 11/00* | (2006.01) | |
| *G01F 11/28* | (2006.01) | |
| *G01F 11/30* | (2006.01) | |
| *B65D 83/54* | (2006.01) | |
| *G01F 13/00* | (2006.01) | |

(52) U.S. Cl.
CPC .............. *G01F 3/36* (2013.01); *B65D 83/54* (2013.01); *G01F 11/006* (2013.01); *G01F 11/28* (2013.01); *G01F 11/30* (2013.01); *G01F 13/006* (2013.01)

(58) Field of Classification Search
CPC ..... B65D 83/54; B65D 83/546; G01F 13/006; G01F 11/30; G01F 11/28; G01F 11/006; G01F 3/36

USPC .................................. 222/402.2; 128/200.23
See application file for complete search history.

(56) References Cited

U.S. PATENT DOCUMENTS

| | | | | |
|---|---|---|---|---|
| 3,138,301 A | * | 6/1964 | Ward ....................... | B65D 7/40 222/335 |
| 4,819,834 A | * | 4/1989 | Thiel ..................... | G01F 11/021 128/200.23 |
| 5,169,038 A | | 12/1992 | Di Giovanni | |
| 6,170,717 B1 | * | 1/2001 | Di Giovanni .......... | B65D 83/54 222/402.2 |
| 6,273,304 B1 | * | 8/2001 | Hoshino ................ | B65D 83/54 222/402.2 |
| 6,302,297 B1 | | 10/2001 | Richardson et al. | |

(Continued)

*Primary Examiner* — Patrick M Buechner
(74) *Attorney, Agent, or Firm* — Muncy, Geissler, Olds & Lowe, P.C.

(57) ABSTRACT

An external metering valve disposed on a gas fuel tank including an outlet rod is provided. The outlet rod includes an outlet orifice at a front end thereof. The external metering valve includes a metering valve and a gas guiding member. The metering valve includes a metering chamber. The gas guiding member includes a communication pipe, a blocking portion on the communication pipe, a discharging channel and an inlet orifice. The gas guiding member has a sealing outlet position and a metering outlet position. At the sealing outlet position, the outlet orifice outputs a gas and stores the gas in the metering chamber. At the metering outlet position, the blocking portion seals the outlet orifice through an airtight ring, and outputs the gas stored in the metering chamber through the inlet orifice and the discharging channel.

9 Claims, 6 Drawing Sheets

(56) References Cited

U.S. PATENT DOCUMENTS

| | | | | |
|---|---|---|---|---|
| 2006/0260608 A1* | 11/2006 | Armstrong | ........ | A61M 15/0028 |
| | | | | 128/200.23 |
| 2007/0034652 A1* | 2/2007 | Petit | .................... | B65D 83/543 |
| | | | | 222/402.2 |
| 2008/0185402 A1* | 8/2008 | Fontela | .................. | B65D 83/54 |
| | | | | 222/402.2 |
| 2014/0124690 A1* | 5/2014 | Kihs | ....................... | F16K 3/267 |
| | | | | 251/320 |

* cited by examiner

EXTERNAL METERING VALVE OF GAS FUEL TANK

FIELD OF THE INVENTION

The present invention relates to a gas fuel tank, and particularly to an external gas outlet structure of a gas fuel tank.

BACKGROUND OF THE INVENTION

A gas fuel tank is for filling combustible gas, and generally provides three gas outlet modes of different states according to requirements. These modes include an outlet off mode, a metering outlet mode and a continual outlet (gas filling) mode. In the metering outlet mode, when a corresponding structure is pressed to a predetermined depth, a quantitative amount of gas is supplied to satisfy the use of a predetermined purpose. In the continual outlet mode, a gas is continually supplied for usage or as a filling gas. In the metering outlet mode, a user is not required to control an output dosage of a gas, such that not only the amount of gas used can be saved but also application safety can be enhanced.

The metering outlet mode, featuring effects of saving resources and being safe and reliable, is one mainstream in using gas fuel tanks. For example, the U.S. Pat. No. 5,169,038, "Metering Valve Usable in the Upsidedown Position", discloses a metering gas outlet structure. In a structure of the above disclosure, two gas channels are respectively disposed above and below a gas guiding member. With a metering chamber in the middle, the gas channels above and below respectively become in communication with the metering chamber to quantitatively discharge a gas. However, such type of metering structure is directly formed on a gas can during a manufacturing process in a way that a user cannot select a metering outlet mode or a continual outlet mode as desired, and may thus provide insufficient convenience.

Further, for example, the U.S. Pat. No. 6,302,297 B1, "External Metering Valve for a Fuel Cell", discloses an external metering valve. The above disclosure may be externally connected to a gas fuel cell, and quantitatively supplies a gas for usage by using a horizontal external metering valve. A gas in the gas fuel cell enters the metering valve through a horizontal transfer pipe, which may cause an excessively long path in between. Further, a gas is blocked and prevented from entering by a sealing effect between an outer wall surface of a pipe for outputting the gas and the metering valve to achieve a demand of quantitatively outputting the gas. However, wear may likely occur due to multiple abrasions between the outer wall surface of the pipe and the metering valve, such that the sealing effect may be not be accomplished to fail the demand for airtightness.

SUMMARY OF THE INVENTION

The primary object of the present invention is to provide a vertical metering gas outputting structure that can be externally connected to a common gas fuel tank. The metering gas outputting structure of the present invention offers good versatility, and is capable of preventing the issue of affected quantitative gas outputting effect caused abrasion and wear.

To achieve the above object, the present invention provides an external metering valve of a gas fuel tank. The external metering valve is disposed on a gas fuel tank including an outlet rod, which includes an outlet orifice at a front end thereof. The external metering valve includes a metering valve, a bottle opening seat and a gas guiding member. The metering valve includes an entrance and an exit at two opposite ends of a straight line, a metering chamber in communication with and between the entrance and the exit, an airtight ring separating the metering chamber and the entrance and facing the outlet orifice, and an inlet pipe plug and an outlet pipe plug respectively provided at the entrance and the exit. The outlet rod penetrates the entrance to allow the outlet orifice to pass through the inlet pipe plug and be close to the airtight ring.

The bottle opening seat is connected to the metering valve, and further fixes the metering valve on the gas fuel tank. The gas guiding member is at the entrance and connected to the metering valve, and includes a communication pipe in communication with inside and outside of the metering valve, a blocking portion at the communication pipe and adjacent to the airtight ring, a discharging channel at the communication pipe and away from one end of the blocking portion, and an inlet orifice formed at a sidewall of the communication pipe and in communication with the discharging channel. The gas guiding member has a sealing outlet position that causes the inlet orifice to locate at one side of the outlet pipe plug away from the entrance, and a metering outlet position that causes the inlet orifice to locate at one side of the outlet pipe plug adjacent to the entrance. At the sealing outlet position, the outlet orifice outputs a gas in the gas fuel tank and stores the gas in the metering chamber. At the metering outlet position, the blocking portion presses and penetrates the airtight ring and seals the outlet orifice to seal the output of the gas in the gas fuel tank, and outputs the gas stored in the metering chamber through the inlet orifice and the discharging channel to outside the gas guiding member.

Accordingly, the gas guiding member is capable of up and down movements, and has the metering outlet position that seals the outlet orifice and the sealing outlet position that does not seal the outlet orifice. At the metering outlet position, the gas stored in the metering chamber may be quantitatively provided to meet application requirements. The metering valve is external connected and is in a vertical installation. Further, the metering chamber is located closely to the outlet orifice, and the outlet orifice is sealed by directly pressing the outlet orifice. Such means not only offers good versatility but also prevents an affected output effect caused by abrasion and wear, hence satisfying the requirement of quantitative gas applications.

DETAILED DESCRIPTION OF THE PREFERRED EMBODIMENTS

Details and technical contents of the present invention are given with the accompanying drawings below.

Figure 1:
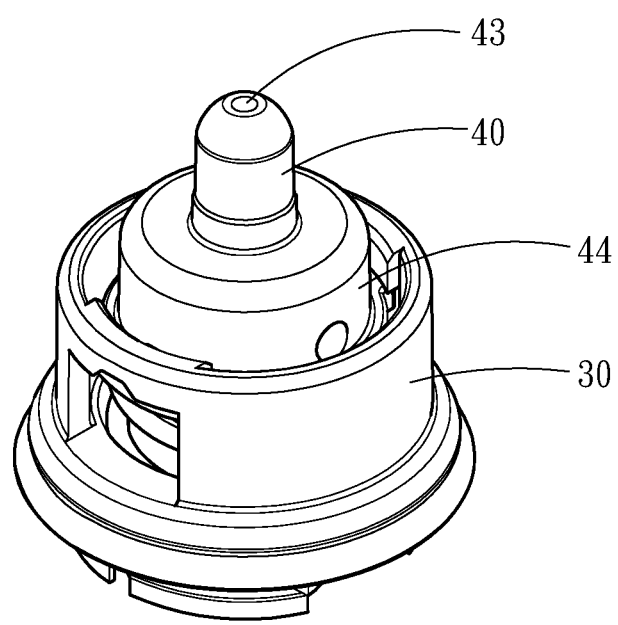
FIG. 1 is a structural appearance diagram of the present invention.
Figure 2:
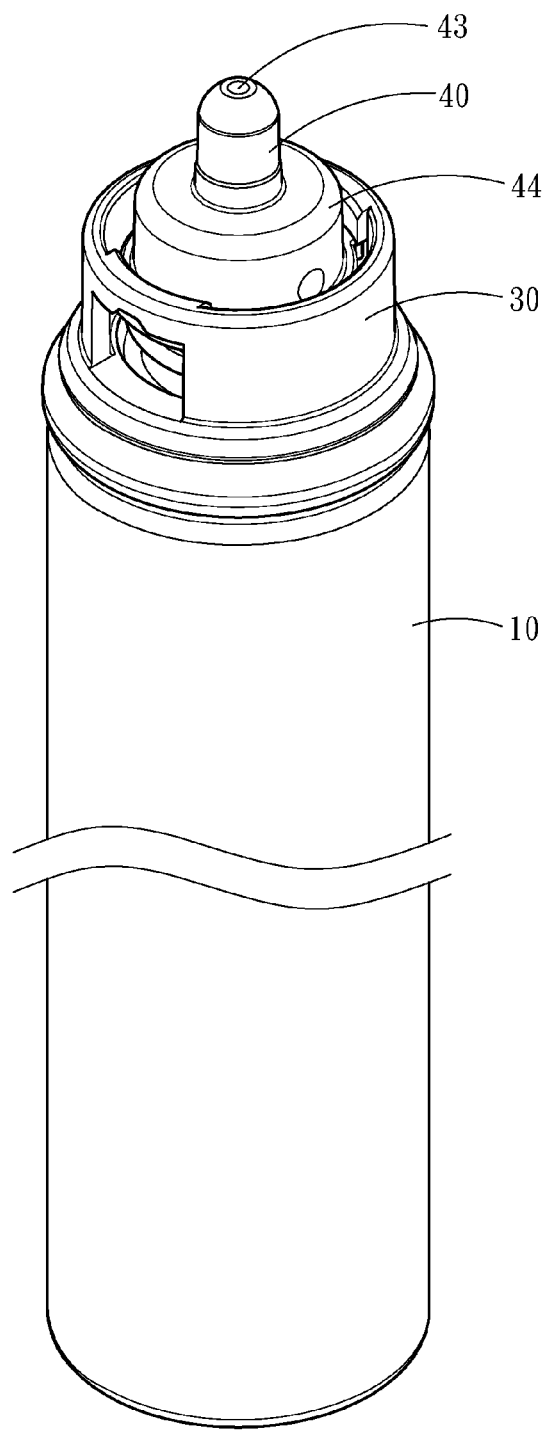
FIG. 2 is an appearance diagram of the present invention installed to a gas fuel tank.
Figure 3:
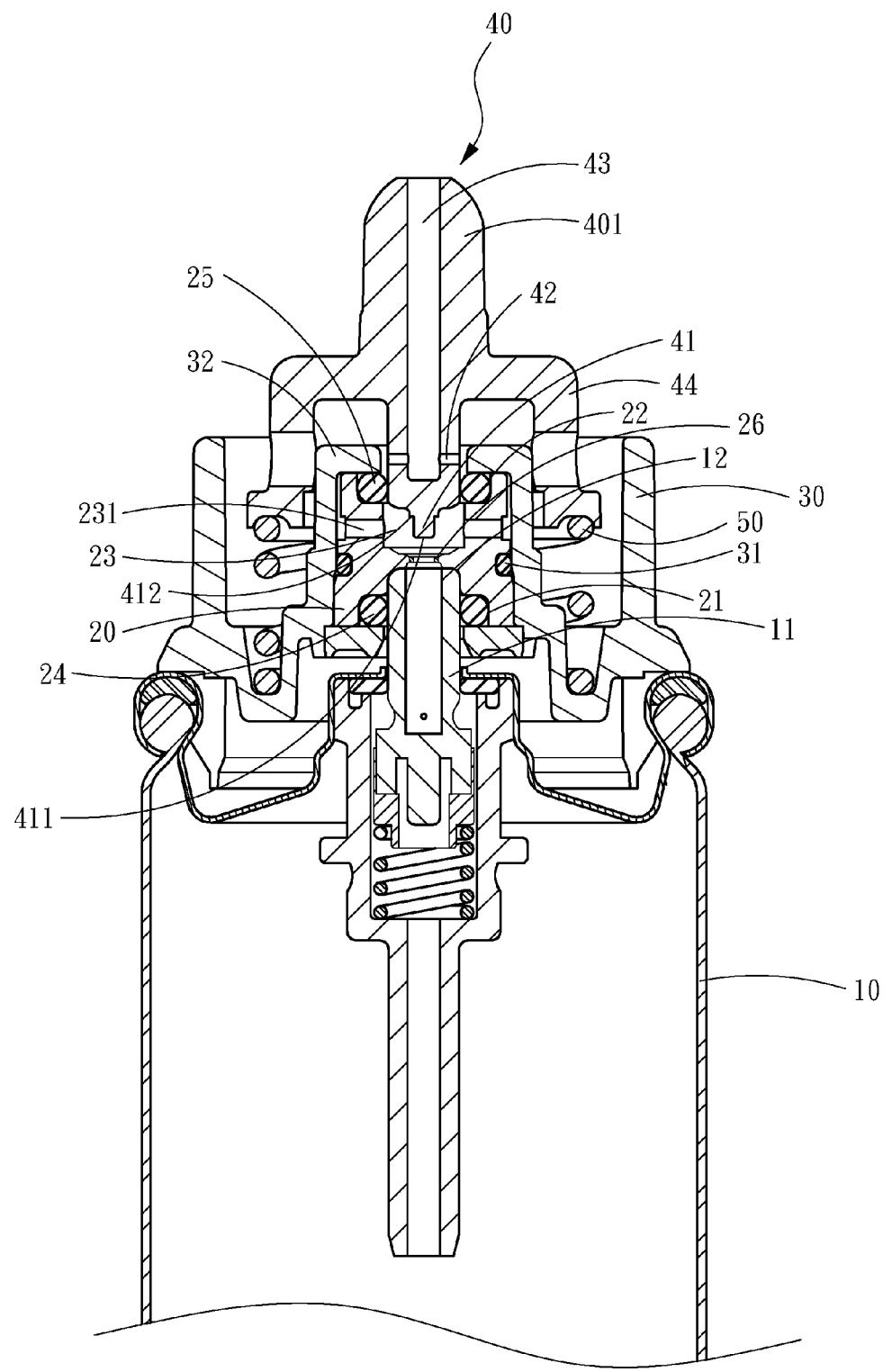
FIG. 3 is a sectional structural diagram of the present invention installed to a gas fuel tank.

Referring to FIG. 1, FIG. 2 and FIG. 3, the present invention provides an external metering valve of a gas fuel tank. The external metering valve is disposed on a gas fuel tank 10 including an outlet rod 11. The outlet rod 11 includes an outlet orifice 12 at a front end thereof. The external metering valve includes a metering valve 20, a bottle opening seat 30 and a gas guiding member 40. The metering valve 20 includes an entrance 21 and an exit 22 at two front and back opposite ends, a metering chamber 23 in communication with and between the entrance 21 and the exit 22, and an airtight ring 26 separating the metering chamber 23 and the entrance 21 and facing the outlet orifice 12. The metering valve 20 further includes at least one expansion passage 231 in communication with the metering chamber 23. In the embodiment, the at least one expansion passage 231 may be expanded by extending the metering chamber 23 radially outwards. With the expansion passage 231 provided, an effective volume of the metering chamber 23 is increased to satisfy application requirements. An inlet pipe plug 24 and an outlet pipe plug 25 are respectively disposed at the entrance 21 and the exit 22. The outlet rod 11 penetrates the entrance 21 and allows the outlet orifice 12 to pass through the inlet pipe plug 24 and be adjacent to the airtight ring 26.

The bottle opening seat 30 is connected to the metering valve 20, and further fixes the metering valve 20 on the gas fuel tank 10. The gas guiding member 40 is disposed at the exit 22, and is connected to the metering valve 20. The gas guiding member 40 includes a communication pipe 401 in communication with inside and outside of the metering valve 20, a blocking portion 41 at the communication pipe 401 and adjacent to the airtight ring 26, a discharging channel 43 at one end of the communication pipe 401 opposite and away from the blocking portion 41, and an inlet orifice 42 formed at a sidewall of the communication pipe 401 and in communication with the discharging channel 43.

The bottle opening seat 30 encloses an outer side surface of the metering valve 20. The at least one expansion passage 231 may penetrate the metering chamber 23 to an outer side surface of the bottle opening seat 30 adjacent to the metering valve 20. Further, the bottle opening seat 30 includes an abutting inner edge 32 adjacent to the outlet pipe plug 25. The abutting inner edge 32 and the metering valve 20 clamp and fix the outlet pipe plug 25 at two sides, respectively. An airtight element 31 is provided at the at least one expansion passage 231 near the entrance 21 and between the bottle opening seat 30 and the metering valve 20. With the airtight element 31 and the outlet pipe plug 25, the metering chamber 23 forms an airtight space to satisfy application requirements.

Figure 4:
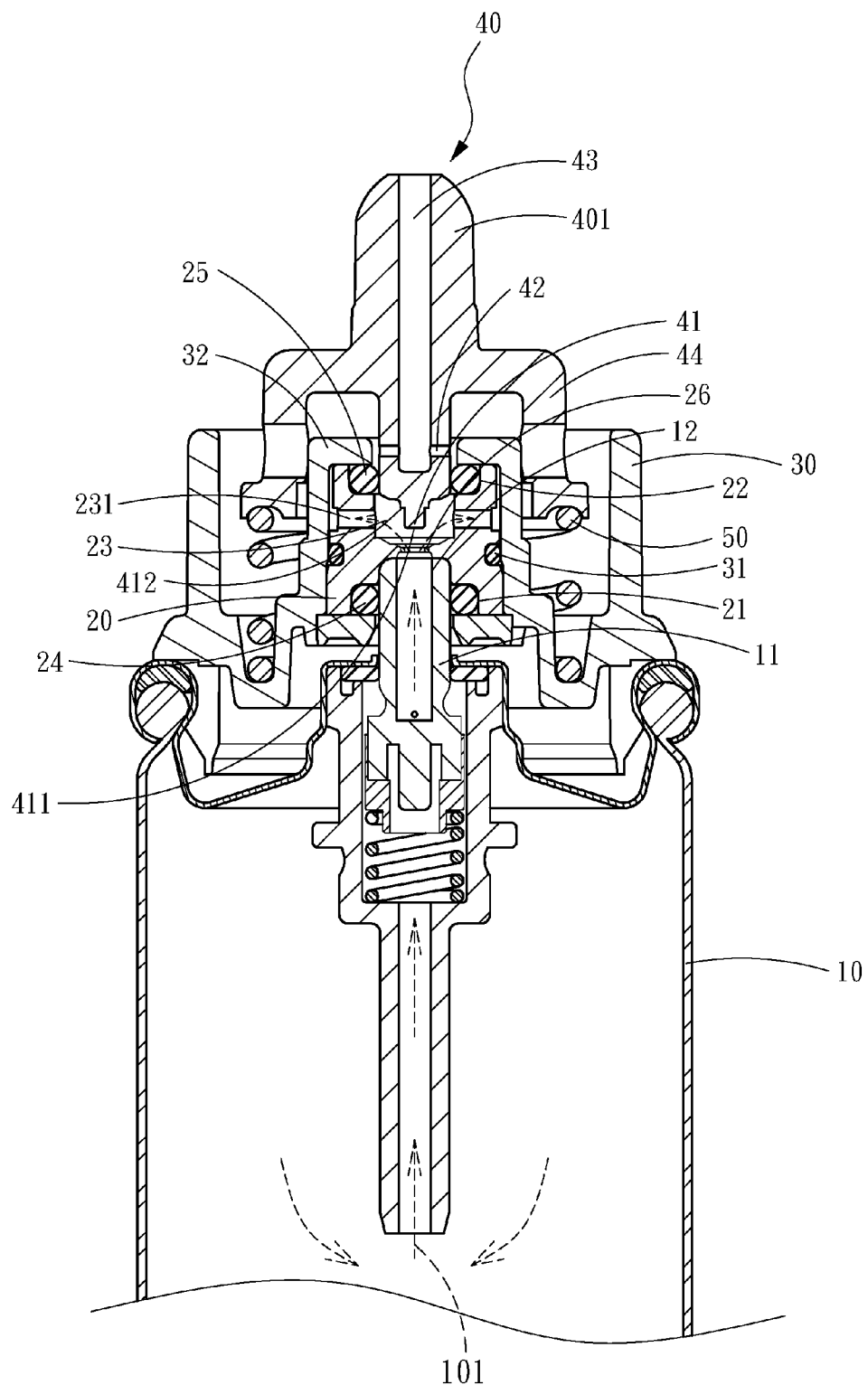
FIG. 4 is a schematic diagram of an airflow of a sealing outlet mode of the present invention.
Figure 5:
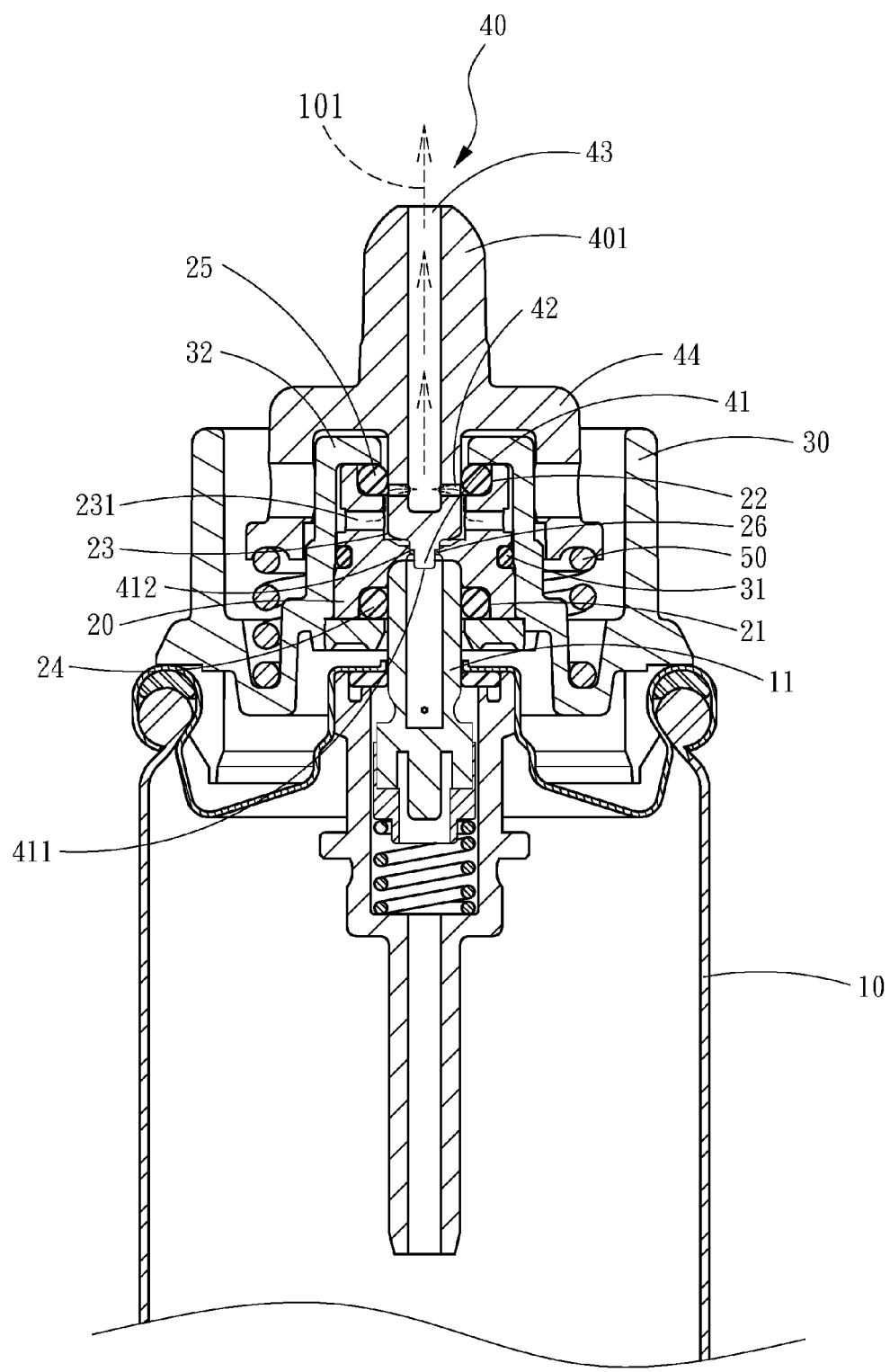
FIG. 5 is a schematic diagram of an airflow of a metering outlet mode of the present invention.

Again referring to FIG. 4 and FIG. 5, the gas guiding member 40 has a sealing outlet position (as shown in FIG. 4) that causes the inlet orifice 42 to locate at one side of the outlet pipe plug 25 away from the entrance 21, and a metering outlet position (as shown in FIG. 5) that causes the inlet orifice 42 to locate at one side of the outlet pipe plug 25 adjacent to the entrance 21. At the sealing outlet position, the outlet orifice 12 outputs a gas 101 in the gas fuel tank 10 and stores the gas 101 in the metering chamber 23.

At the metering outlet position, the blocking portion 41 presses and penetrates the airtight ring 26 and seals the outlet orifice 12 to seal the output of the gas 101 in the gas fuel tank 10, and outputs the gas 101 stored in the metering chamber 23 through the inlet orifice 42 and the discharging channel 43 to outside the gas guiding member 40. A front end of the blocking portion 41 includes a high portion 411 penetrating the airtight ring 26 and a low portion 412 pressing the airtight ring 26. The high portion 411 penetrates the airtight ring 26 to form a first-tier airtight structure, and the low portion 412 presses the airtight ring 26 to form a second-tier airtight structure, hence forming two tiers of airtight structures. When the airtight ring 26 is worn and aged, the second-tier airtight structure is still capable of maintaining good airtightness through such pressing means.

The gas guiding member 40 may include an annular side plate 44. An elastic element 50 is disposed between the annular side plate 44 and the bottle opening seat 30. For example, the elastic element 50 may be a spring, and pushes the gas guiding member 40 to cause the blocking portion 41 to be away from the outlet orifice 12 and to cause the inlet orifice 42 to constantly locate at the sealing outlet position at one side of the outlet pipe plug 25 away from the entrance 21.

Figure 6:
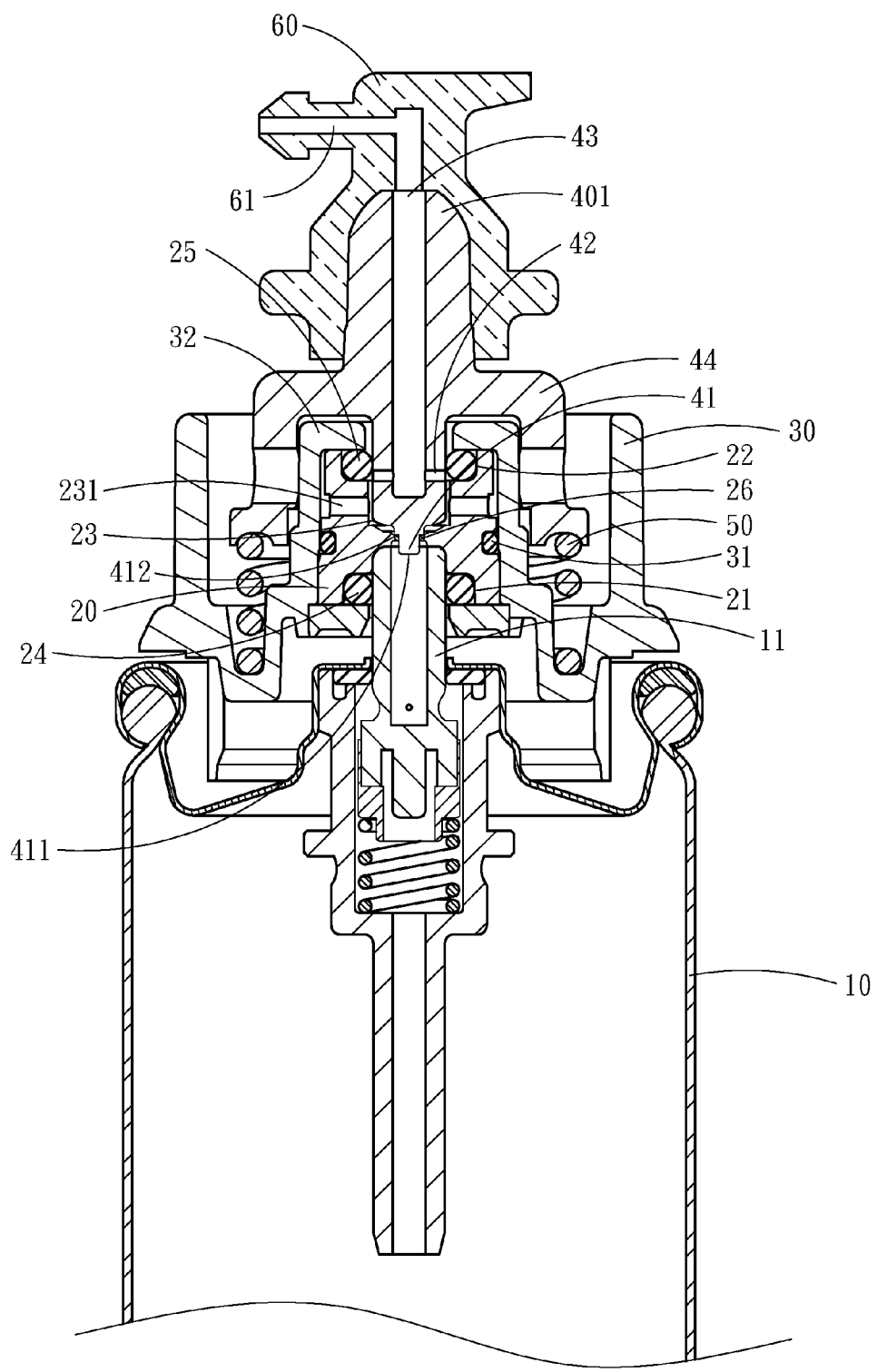
FIG. 6 is a schematic diagram of installing a turning gas nozzle of the present invention.

Referring to FIG. 6 showing another embodiment of the present invention, the present invention may further include a turning connector 60. The turning connector 60 is accommodated around the gas guiding member 40, and includes a turning conduit 61 in communication with the discharging channel 43. The turning conduit 61 of the turning connector 60 is capable of changing an outlet direction of the gas to enhance application convenience.

In conclusion, compared to a conventional solution, the present invention provides following advantages.

1. The present invention may be externally connected to a common gas fuel tank, and thus provides good versatility for satisfying application requirements.

2. The present invention is in a vertical installation, and may be turned through the turning connector to satisfy application requirements of various directions.

3. Through the airtight element, the inlet pipe plug and the outlet pipe plug, the present invention achieves an airtight effect without involving extremely precise assembly elements and has a high manufacturing yield rate.

4. With the expansion passage, given that the size of the gas fuel can is kept unchanged, the volume of the gas stored can be effectively increased to satisfy application requirements.

5. Through the blocking portion that presses and penetrates the airtight ring and the means of directly pressing tightly against the airtight ring to seal the outlet orifice, two tiers of airtight structures are formed to maintain good airtightness through such pressing method.

What is claimed is:

1. An external metering valve of gas fuel tank, disposed on a gas fuel tank comprising an outlet rod, the outlet rod comprising an outlet orifice at the front end thereof, the external metering valve comprising:

a metering valve, comprising an entrance and an exit provided at two opposite ends of a straight line, a metering chamber in communication with and between the entrance and the exit, and an inlet pipe plug and an outlet pipe plug respectively disposed at the entrance and the exit, the outlet rod penetrating the entrance and causing the outlet orifice to pass through the inlet pipe plug to be in communication with the metering chamber;

a bottle opening seat, connected to the metering valve and further fixing the metering valve on the gas fuel tank; and a gas guiding member, disposed at the exit and connected to the metering valve, comprising a communication pipe in communication with inside and outside of the metering valve, a blocking portion at the communication pipe and adjacent to the outlet orifice, a discharging channel at one end of the communication pipe opposite and away from the blocking portion, and an inlet orifice formed at a sidewall of the communication pipe and in communication with the discharging channel;

wherein, the gas guiding member has a sealing outlet position that causes the inlet orifice to locate at one side of the outlet pipe plug away from the entrance, and a metering outlet position that causes the inlet orifice to locate at one side of the outlet pipe plug adjacent to the entrance; at the sealing outlet position, the outlet orifice outputs a gas in the gas fuel tank and stores the gas in the metering chamber; at the metering outlet position, the blocking portion covers the outlet orifice to seal the output of the gas in the gas fuel tank, and outputs the gas stored in the metering chamber through the inlet orifice and the discharging channel to outside the gas guiding member.

2. The external metering valve of gas fuel tank of claim 1, wherein the metering valve further comprises at least one expansion passage in communication with the metering valve.

3. The external metering valve of gas fuel tank of claim 2, wherein the bottle opening seat encloses an outer side surface of the metering valve, and the at least one expansion passage penetrates the metering chamber to an outer side surface of the bottle opening seat adjacent to the metering valve.

4. The external metering valve of gas fuel tank of claim 3, wherein an airtight element is provided at the at least one expansion passage near the entrance and between the bottle opening seat and the metering valve.

5. The external metering valve of gas fuel tank of claim 1, wherein the bottle opening seat comprises an abutting inner edge adjacent to the outlet pipe plug, and the abutting inner edge and the metering valve respectively clamp and fix the outlet pipe plug at two sides.

6. The external metering valve of gas fuel tank of claim 1, wherein the gas guiding member comprises an annular side plate, an elastic element is disposed between the annular side plate and the bottle opening seat, the elastic element pushes the gas guiding member to cause the blocking portion to be away from the outlet orifice and to cause the inlet orifice to constantly locate at the sealing outlet position at one side of the outlet pipe plug away from the entrance.

7. The external metering valve of gas fuel tank of claim 1, further comprising a turning connector, the turning connector accommodating around the gas guiding member and comprising a turning conduit in communication with the discharging channel.

8. The external metering valve of gas fuel tank of claim 1, wherein the metering valve further comprises an airtight ring separating the metering chamber and the entrance and facing the outlet orifice, the outlet rod penetrates the entrance and allows the outlet orifice to pass through the inlet pipe plug and be adjacent to the airtight ring, and at the metering outlet position, the blocking portion penetrates the airtight ring and seals the outlet orifice to seal the output of the gas in the gas fuel tank, and outputs the gas stored in the metering chamber through the inlet orifice and the discharging channel to outside the gas guiding member.

9. The external metering valve of gas fuel tank of claim 8, wherein a front end of the blocking portion comprises a high portion penetrating the airtight ring and a low portion pressing the airtight ring.

* * * * *